(12) United States Patent
Aoyama et al.

(10) Patent No.: US 7,420,716 B2
(45) Date of Patent: Sep. 2, 2008

(54) IMAGE READING APPARATUS

(75) Inventors: Takeshi Aoyama, Chiba (JP); Hiroaki Takagishi, Tokyo (JP); Takayuki Suga, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1007 days.

(21) Appl. No.: 10/404,056

(22) Filed: Apr. 2, 2003

(65) Prior Publication Data

US 2004/0021913 A1 Feb. 5, 2004

(30) Foreign Application Priority Data

Apr. 2, 2002 (JP) ............................. 2002-100105
Apr. 2, 2002 (JP) ............................. 2002-100106

(51) Int. Cl.
*H04N 1/04* (2006.01)
(52) U.S. Cl. ....................... 358/474; 358/475; 358/509; 358/437; 399/92; 399/94; 355/67
(58) Field of Classification Search ................. 358/474, 358/475, 509, 510, 437; 399/92, 94; 355/67
See application file for complete search history.

(56) References Cited

U.S. PATENT DOCUMENTS

| | | | | |
|---|---|---|---|---|
| 4,082,943 | A * | 4/1978 | Jensen et al. | 714/2 |
| 5,034,781 | A * | 7/1991 | Watanabe | 399/395 |
| 5,860,042 | A * | 1/1999 | Tomaru et al. | 399/92 |
| 5,920,749 | A * | 7/1999 | Sugaya et al. | 399/69 |
| 6,643,476 | B1 * | 11/2003 | Kinouchi et al. | 399/69 |
| 6,810,230 | B2 * | 10/2004 | Imai et al. | 399/328 |

FOREIGN PATENT DOCUMENTS

| | | |
|---|---|---|
| JP | 61-26368 | 2/1986 |
| JP | 6-308627 | 11/1994 |
| JP | 10-161401 | 6/1998 |
| JP | 10-164328 | 6/1998 |
| JP | 11-164097 | 6/1999 |
| JP | 2000-92279 | 3/2000 |
| JP | 2001-119533 | 4/2001 |
| JP | 2002-33888 | 1/2002 |

OTHER PUBLICATIONS

Office Action from counterpart application 031215335 from Patent Office in China.

* cited by examiner

*Primary Examiner*—Edward L. Coles, Sr.
*Assistant Examiner*—Negussie Worku
(74) *Attorney, Agent, or Firm*—Fitzpatrick, Cella, Harper & Scinto (57) ABSTRACT

An object of this invention is to provide an image reading apparatus capable of reading an original image at high speed. And other object is to provide an image reading apparatus in which even when heat is generated at an inverter, reading operation is not influenced. In order to achieve these object, the image reading apparatus is comprised with a scanning means including, a light source for illuminating an original, an image pickup element for receiving reflected light from the original, a cabinet and an inverter provided at a vicinity of a side face of the cabinet in parallel with a direction of moving the light source for driving the light source, a communicating means provided at a vicinity of a side face of the cabinet opposed to the side face at the vicinity of the inverter and a cooling fan for cooling an interval between the inverter and the communicating means.

20 Claims, 9 Drawing Sheets

IMAGE READING APPARATUS

This application claims the right of priority under 35 U.S.C. § 119 based on Japanese Patent Application Nos.JP 2002-100105 and JP 2002-100106 which are hereby incorporated by reference herein in their entirety as if fully set forth herein.

BACKGROUND OF THE INVENTION (i) Field of the Invention

The present invention relates to an image reading apparatus for reading an image of the original by receiving light reflected from an original by an image pickup element.

(ii) Description of the Related Art

In a related art, there is known an image reading apparatus disclosed in JP-A-6-308627.

Figure 2:
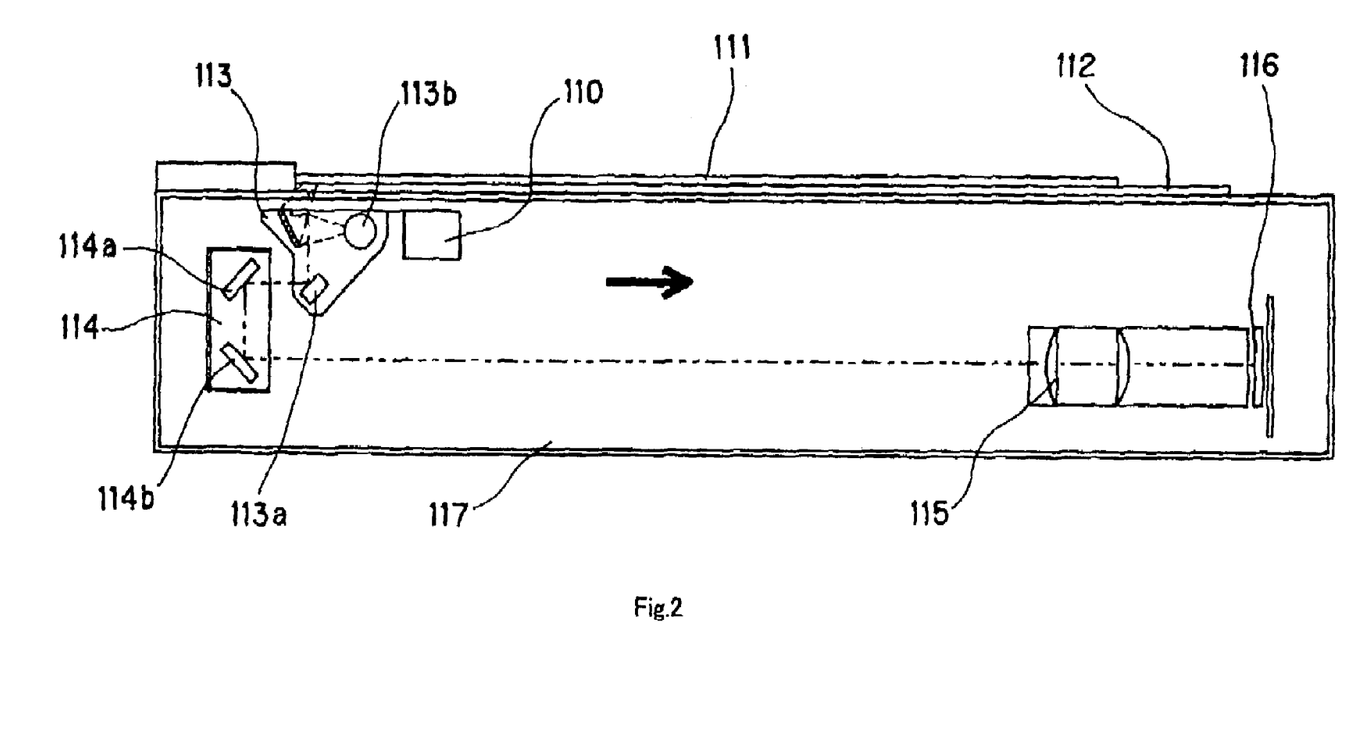
FIG. 2 is a view for explaining a related art.

FIG. 2 shows the related art.

In FIG. 2, at an original 111 mounted on an original base plate 112 above an image reading apparatus 117, reflected image light is generated by light irradiated by a light source 113b provided at a first carriage 113, and the reflected light is reflected by reflecting members 113a at the first carriage, 114a and 114b provided at a second carriage and thereafter focused in the form of a line on CCD (Charge Couple Device) 116 which is an image pickup element via a focusing lens 115. The apparatus uses a reduction optical system.

Further, by moving the first carriage and the second carriage in a direction (the direction indicated by an arrow in the drawing, sub-scanning direction) orthogonal to a line direction (main scanning direction), an image of the original is successively scanned.

Here, an inverter 110 for supplying power to the light source is mounted at the first carriage.

Figure 3:
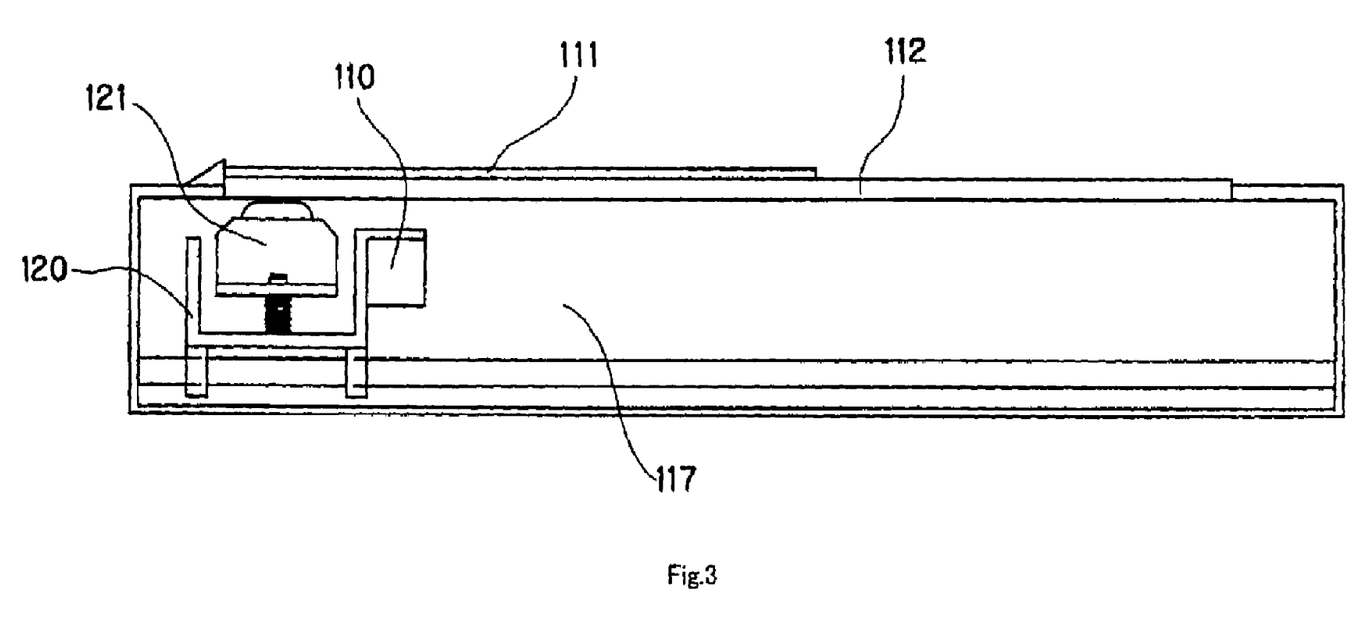
FIG. 3 is a view for explaining a related art.

Further, in recent years, as shown in FIG. 3, there is also proposed an apparatus in which a contact image sensor 121 having a length equal to or larger than an original width is mounted to the carriage 120 and an original image is read by equal magnification by scanning the original image. In the drawing, the same numerals as those of FIG. 2 designate members operated similarly. The apparatus uses an equal magnification optical system.

Further, the above-described two apparatus are generally the image reading apparatus enabling the original to be scanned by moving the original above a reading position without driving a scanning optical system by using an automatic original feeding apparatus.

Further, in many cases, when the apparatus main body is divided in two regions by a plane orthogonal to a main scanning direction of scanning means, it is general to arrange driving means (motor) of the scanning means to a side arranged with power supplying means to thereby shorten a length of a power line in order to prevent an increase in cost.

In recent years, reading time is rapidly faster at an image reading apparatus and in accordance therewith, in order to provide a necessary exposure quantity per unit time, it is indispensable to make brightness of scanning light higher.

Further, it is necessary to form a memory circuit or the like in a large scale for higher image quality and therefore, the signal processing circuit for outputting an image signal is also large-sized.

However, in making brightness of light source higher, the inverter is large-sized and the temperature of the inverter becomes high and therefore, when the inverter is mounted on the first carriage as in the related arts, the following problem is posed.

By an increase in weight of the scanning base, a large-sized formation of the driving means, an increase in the cost and an increase in power consumption are caused.

Figure 4:
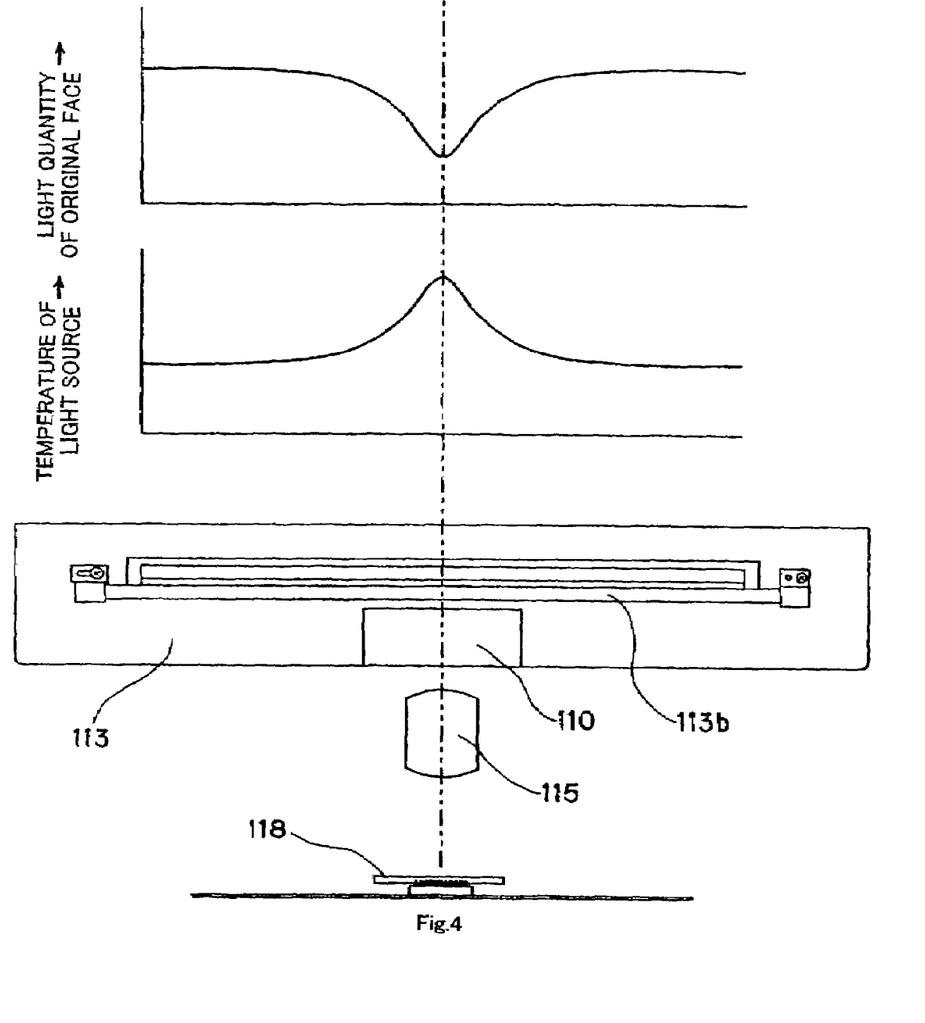
FIG. 4 is a view for explaining a relationship between temperature and brightness around a light source.

As shown in FIG. 4, according to a relationship between a position of the first carriage in a longitudinal direction and temperature of the light source, by influence of heat generation of the inverter, a temperature distribution of the light source in the longitudinal direction becomes extremely nonuniform, a light quantity in the longitudinal direction becomes nonuniform and therefore, partial fogging, lack of image or the like is brought about in an image reading signal.

According to the apparatus using the contact image sensor 121 as shown in FIG. 3, the contact image sensor 121 is mounted on a carriage 120 mounted with the inverter 110 and therefore, by influence of heat of the inverter 110, there is brought about image failure or malfunction of a CCD line sensor present at inside of the contact image sensor which is caused by exceeding guaranteed operation temperature.

Further, in case of mounting an inverter to an apparatus cabinet at an image reading apparatus using a reduction optical system, in order to thin the apparatus, it is general to mount the inverter more remote than an arrival position of the second carriage most remote from a home position to thereby prevent interference with the second carriage in moving and scanning operation. Therefore, the following problem is posed.

Figure 6:
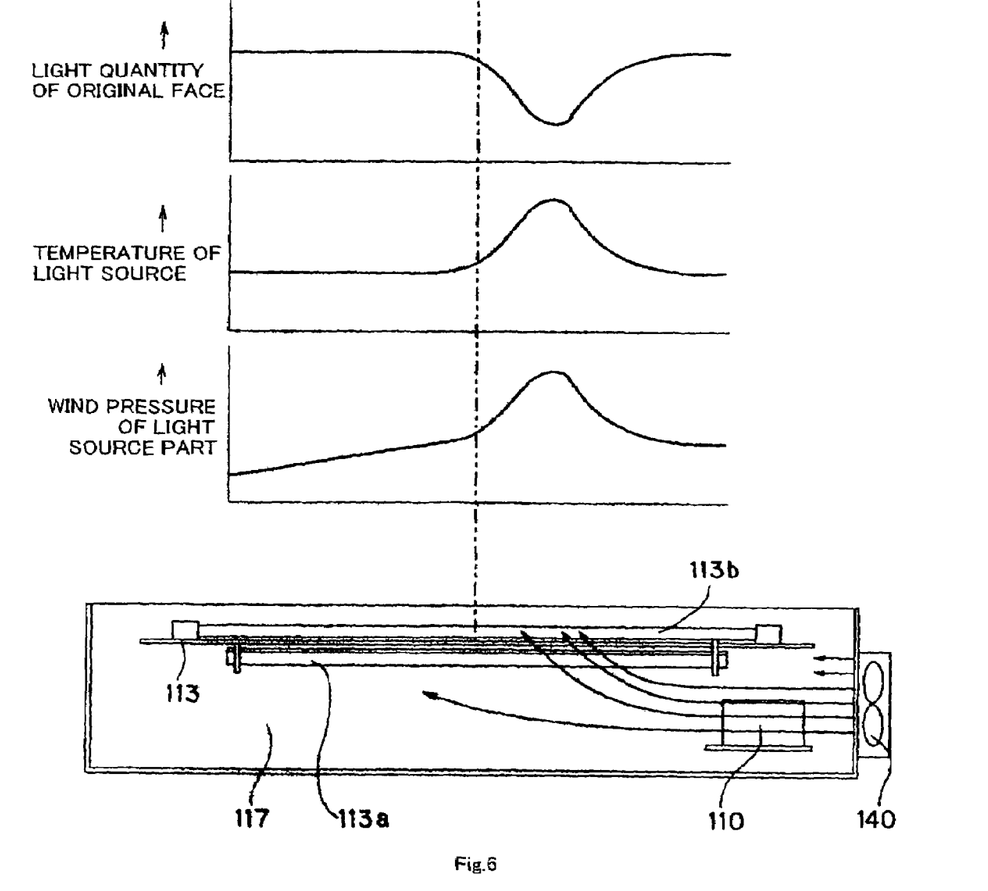
FIG. 6 is a view for explaining a relationship between temperature and brightness around a light source in moving an original by automatic original feeding apparatus.

In the case of moving the original using a carrier belt by an automatic original feeding apparatus using the belt, the original moves when a first carriage of a scanning base is fixed at a vicinity of a center of an original base plate and a vicinity of an end side of the original base plate and therefore, when an inverter is arranged on a back side of an apparatus cabinet and forcedly cooled by cooling means (air blowing apparatus) 140, as shown in FIG. 6, hot wind passing through the inverter 110 flows in the longitudinal direction of a light source and therefore, a temperature distribution of the light source is made nonuniform and partial fogging, lack of image or the like is brought about in an image reading signal similar to the above-described.

When the inverter is arranged on the back side of the apparatus cabinet on the end side of the original base plate and forcedly cooled, hot air impinges also on CCD or a drive circuit thereof disposed downstream from the inverter as seen from the air blowing source. It causes also a problem of erroneous operation or malfunction of IC and the like.

Figure 7:
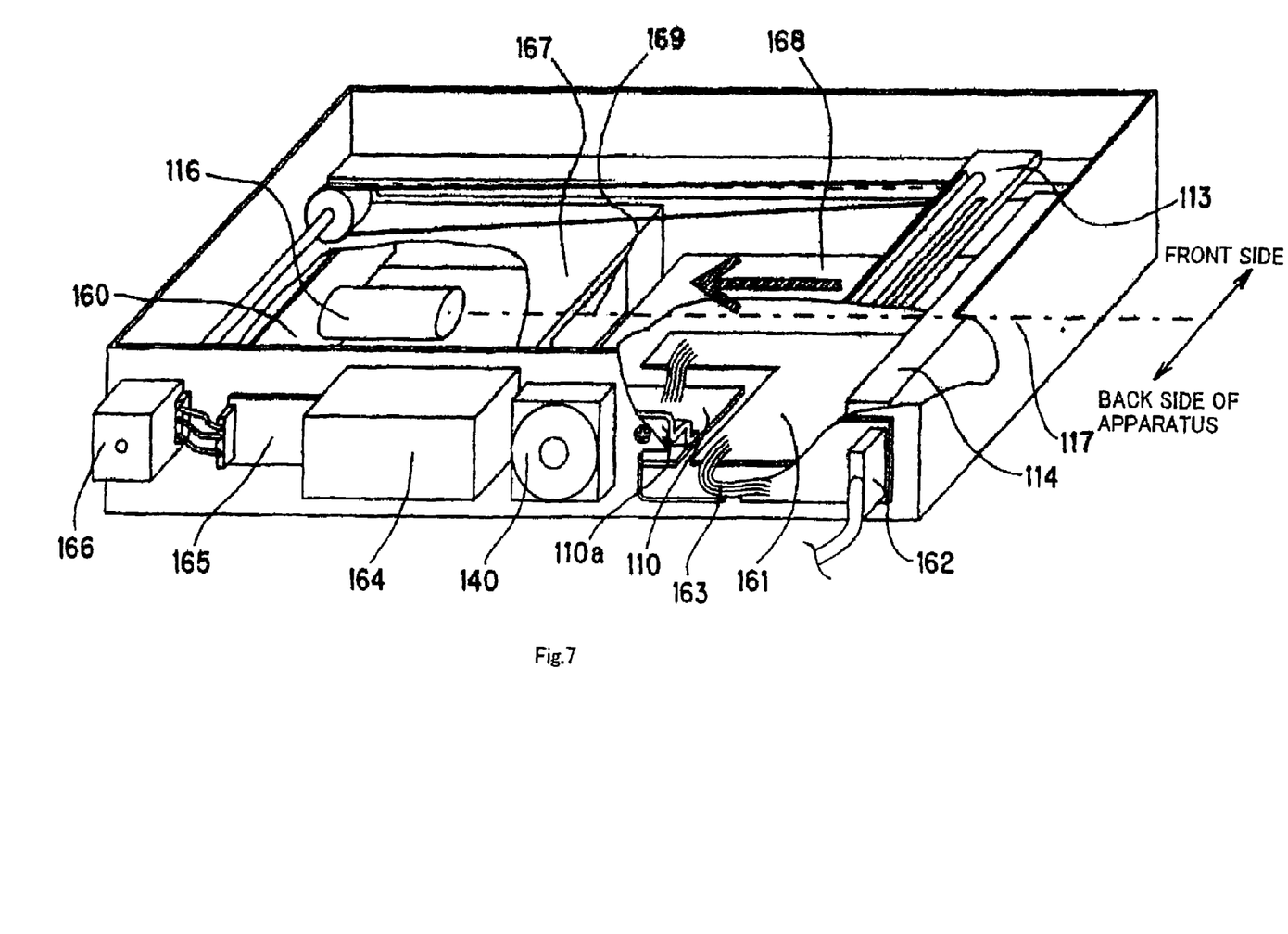
FIG. 7 is a view for explaining a constitution of an image reading apparatus.

In the case of arranging the inverter on the back side of the apparatus cabinet, when a board is arranged into the same size apparatus as that of the related art, the noise is liable to be picked up and a problem of image failure is liable to be brought about because connecting a control circuit board 161 for processing an image signal and controlling the apparatus and a communicating means 162 for outputting image data to other apparatus by a shortest distance as shown in FIG. 7 forces a signal line 163 to pass a vicinity of the inverter 110 constituting a source of noise by large-sized inverter.

When the inverter is arranged on the back side of the apparatus cabinet, as shown in FIG. 7 since an apparatus drive power source 164, a scanning means drive motor 166 and a driver circuit 165 that generate heat are concentrated on the back side of the apparatus cabinet, air warmed by heat from these members is blown to the inverter by cooling means 140, further, when a heat radiating member 110a directly connected to a heat radiating source of the inverter is connected to the apparatus cabinet, by heat conducted from these members to the apparatus cabinet, a time period taken until saturating temperature of the inverter is shortened and balancing temperature is elevated.

Here, as shown in FIG. 7, a cover 167 is provided with in order to prevent outside light from being incident on a CCD unit as much as possible and prevent emittance of noise from a CCD drive circuit 160, further, a cover 168 is provided with in order to prevent pickup of noise to the control circuit board 161 and emittance of noise.

Further, although JP-A-2001-119533 discloses an image reading apparatus arranged with an inverter 214 within a width of an optical system for illuminating and scanning an original, the problem by the heat of the inverter cannot be resolved.

SUMMARY OF THE INVENTION

It is an object of the invention to provide an image reading apparatus capable of reading an original image at high speed.

It is other object of the invention to provide an image reading apparatus in which even when heat is generated at an inverter, reading operation is not influenced.

It is still other object of the invention to provide an image reading apparatus comprising:

an original base plate for mounting an original;

a scanning means for scanning to read the original mounted on the original base plate, said scanning means including a light source for illuminating the original and an image pickup element for receiving reflected light from the original;

a cabinet having said original base plate at an upper portion thereof and containing said scanning means;

an inverter provided at a vicinity of a side face of said cabinet in parallel with a direction of moving said light source for driving said light source;

a communicating means provided at a vicinity of a side face of said cabinet opposed to the side face at the vicinity of the inverter for outputting a read image data to outside; and an cooling fan for cooling an interval between said inverter and said communicating means.

Still other object of the invention will become apparent by the following explanation.

DESCRIPTION OF THE PREFERRED EMBODIMENTS

Embodiments of the invention will be explained in reference to the drawings below.

Figure 1:
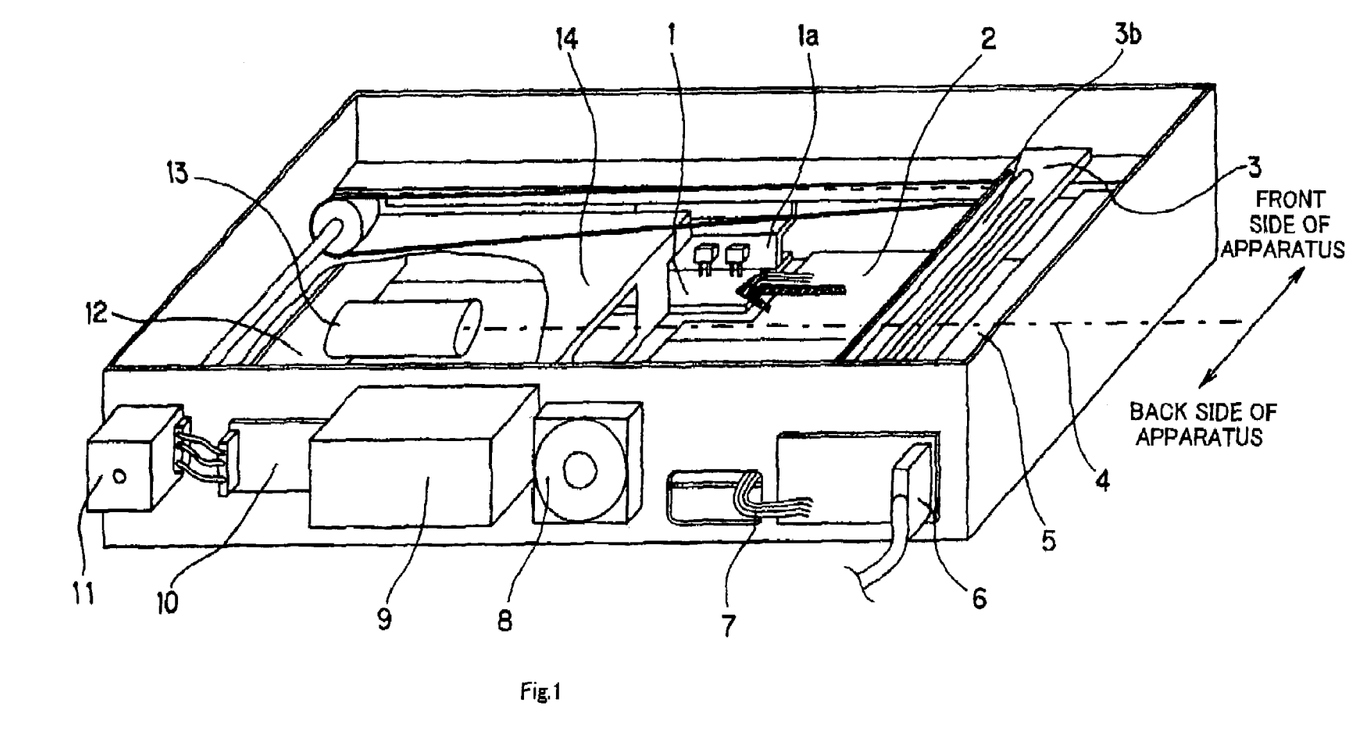
FIG. 1 is a view showing a first embodiment.

FIG. 1 is a perspective view of a first embodiment of an image reading apparatus according to the invention.

Further, in FIG. 1, a transparent original base plate 112 for mounting an original is omitted.

In FIG. 1, reflected image light is generated by light irradiated by a light source (illuminating means) 3b provided at a first carriage 3 and supplied with power by an inverter 1, and the reflected light is reflected by reflecting members (not illustrated) provided at the first carriage and a second carriage (not illustrated) and thereafter focused in the form of a line on CCD (image pickup means)which is not illustrated via a focusing lens 13.

Further, by moving the first carriage and the second carriage in a direction (the direction indicated by an arrow in the drawing, sub-scanning direction) orthogonal to a line direction (main scanning direction), successively, an image of an original is scanned, or by using an automatic original feeding apparatus, the image is scanned by moving the original without moving the first carriage and the second carriage.

The reflected light from the original is focused on CCD after being reduced.

The inverter 1 is arranged at a vicinity of a side face of a cabinet substantially in parallel with the moving direction of the carriage on a side on which a heat generating source such as power supplying means 9 for supplying power to a drive source at inside of the image reading apparatus, a drive motor 11 which is driving means for driving scanning means and a driver circuit 10 of the drive motor are not concentrated.

Further, according to the embodiment, the side for operating the apparatus is front side.

Therefore, a heat radiating member 1a directly connected to a heat radiating source of the inverter can be connected to a cabinet wall hardly influenced by heat from the drive motor and the driver circuit and therefore, heat can efficiently be radiated without shortening a time period taken until saturating temperature of the inverter or elevating balancing temperature.

Although the effect can be realized without providing cooling means 8, when an image reading apparatus main body is divided into two regions by a plane orthogonal to the main scanning direction of the scanning means, by arranging the cooling means 8 at the region on a side of being arranged with the power supplying means 9, the drive motor 11 and the driver circuit 10 and cooling the region between the inverter and the communicating means, the inverter can be cooled further effectively Further, in moving an original using a carrier belt by an automatic original feeding apparatus using the belt, even when the first carriage of the scanning base is fixed at a vicinity of a center of the original base plate and a vicinity of an end side of the original base plate, since the inverter is arranged such that illuminating means is disposed at a region except a downstream side of the inverter relative to a flow path of air formed by cooling means and passing the inverter, hot air passing the inverter is not directed to the illuminating means and therefore, nonuniformity of a light quantity in accordance with nonuniformity of a temperature distribution of the light source can be prevented.

Similarly, by arranging the inverter as in the embodiment, CCD is disposed at a region except the downstream side of the inverter relative to the flow path of air formed by the cooling means and passing the inverter and therefore, hot air passing the inverter is not directed to CCD and therefore, CCD is not subjected to high temperature and excellent image quality is guaranteed.

Further, the inverter is arranged at a region on a side on which communicating means 6 outputting image data to other apparatus is not arranged when the image reading apparatus main body is divided into two regions by the plane orthogonal to the main scanning direction of the scanning means and therefore, a signal line 7 connecting a control circuit board 2 for processing an image signal and controlling the apparatus and the communicating means 6 does not pass a vicinity of the inverter constituting a source of noise and therefore, a large-sized inverter can be mounted even in the image reading apparatus having a size similar to that of the related art.

Further, a cover 14 is provided with in order to prevent outside light from being incident on a CCD unit as much as possible and prevent emittance of noise from a CCD drive circuit.

Further, a similar configuration can be constituted even when the scanning means is provided with both of a function of scanning the image of the original by moving in the sub-scanning direction and a function of scanning the image by moving the original while being stationary.

Further, by embodying the invention by constituting the illuminating means by a xenon tube having small sensitivity of a variation in a light quantity, a light source having high brightness can be realized in a minimum space.

Although the embodiment of FIG. 1 shows a part arrangement and a constitution with regard to the case in which the scanning means and the image pickup means constitute the reduction optical system, a similar part arrangement and a similar constitution can be constituted also in a case of a equal magnification optical system.

Figure 5:
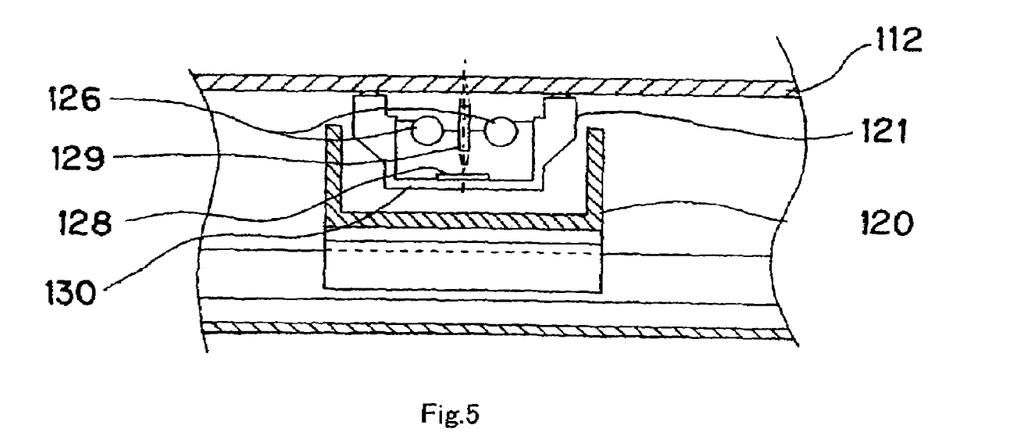
FIG. 5 is a view for explaining inside of a contact image sensor.

FIG. 5 shows a second embodiment using an equal magnification optical system using a contact image sensor.

According to the equal magnification optical system, a contact image sensor is directly mounted on the carriage (3) and in the contact image sensor, a light source (illuminating means), a CCD line sensor (image pickup means), a selfoc lens (registered trademark) (focusing means) and the like are mounted and integrated to a housing (refer to FIG. 5).

Further, by moving the carriage (3) integrated and mounted with a portion in correspondence with scanning means which is an apparatus for scanning an image of an original by illuminating the original by illuminating means and focusing the image of the original to the image pickup means via focusing means and the CCD line sensor which is the image pickup means in the sub-scanning direction (the direction indicated by an arrow in the drawing), successively, the image of the original is scanned and picked up, or the image is scanned and picked up by moving the original without moving the carriage by using an automatic original feeding apparatus.

According to the constitution, the housing of the contact image sensor is disposed at a region except the downstream side of the inverter relative to a flow path of air formed by cooling means and passing through the inverter and therefore, hot wind passing through the inverter is not directed to the side of the housing of the contact image sensor and therefore, a deterioration in an optical function at a single part caused by increasing an amount of enlarging the respective part at inside of the contact image sensor due to thermal expansion and defocusing or color shift caused by deviating an allowable difference of a positional shift among the respective parts from an optical design value can be prevented.

Similarly, even in the equal magnification optical system, a similar configuration can be constituted not only when the scanning means is provided with either one of a function of scanning the image of the original by moving in the sub-scanning direction or a function of scanning the image of the original by moving the original while being stationary but also when the scanning means is provided with both of the function of scanning the image of the original by moving in the sub-scanning direction and the function of scanning the image of the original by moving the original while being stationary.

Further, the image reading apparatus of the embodiment is applicable to an image forming apparatus having an image forming portion for forming an image of the original picked up by the image reading apparatus on a sheet. Thereby, the image forming apparatus capable of forming an image of high quality at high speed can be realized.

Figure 8:
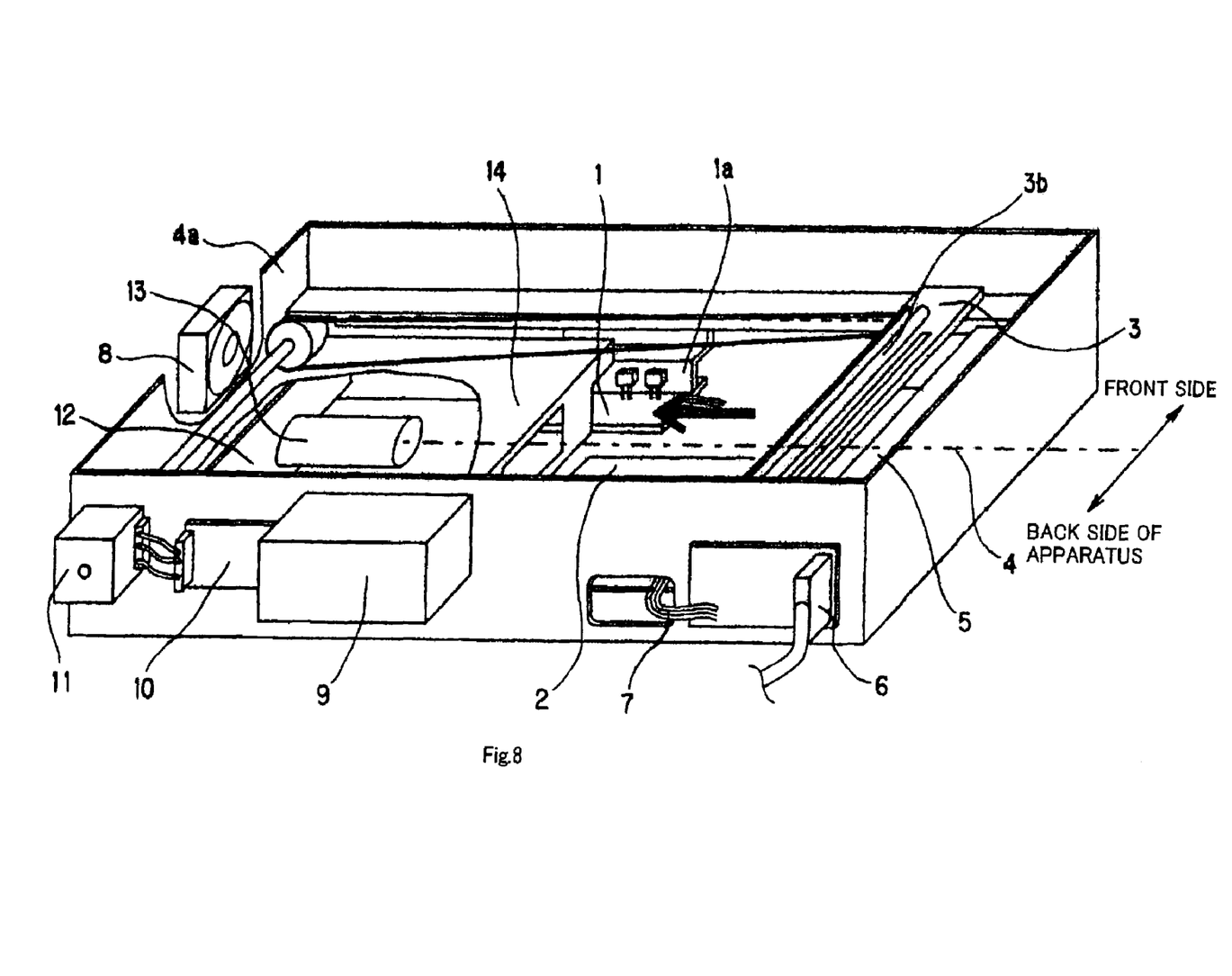
FIG. 8 is a view showing a third embodiment.

FIG. 8 shows a third embodiment.

According to the embodiment, a cooling fan 8 is arranged at the apparatus cabinet which is not arranged with the heat generating sources and at the side wall 4a in a vicinity of a drive circuit 12 for driving CCD to intake or exhaust air therefrom and therefore, not only the inverter can efficiently be cooled without shortening a time period taken until saturating temperature of the inverter or elevating balancing temperature but also the CCD drive circuit and the image pickup means can also be cooled.

Figure 9:
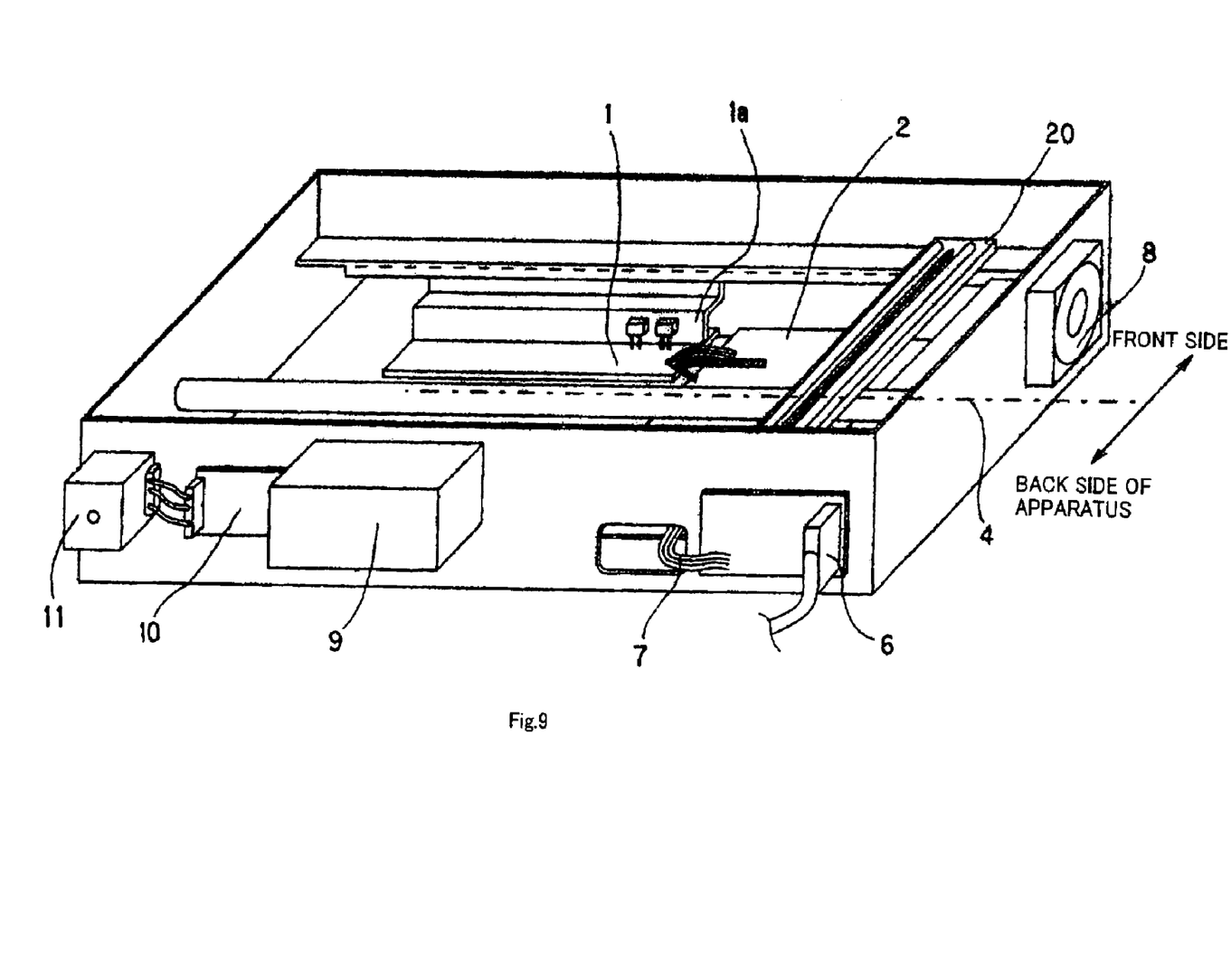
FIG. 9 is a view showing a fourth embodiment.

FIG. 9 shows a fourth embodiment.

According to the equal magnification optical system, a contact image sensor is mounted directly on a carriage 20 and in the contact image sensor, a light source (illuminating means), a CCD line sensor (image pickup means), a selfoc lens (registered trademark) (focusing means) and the like are mounted and integrated to a housing (refer to FIG. 5).

Further, by moving the carriage 20 integrated and mounted with a portion in correspondence with scanning means which is an apparatus for scanning an image of the original by illuminating the original by illuminating means and focusing the image of the original to image pickup means via focusing means and the CCD line sensor which is the image pickup means in the sub-scanning direction (the direction indicated by an arrow in the drawing), successively, the image of the original is scanned and picked up, or the image is scanned and picked up by moving the original without moving the carriage by using an automatic original feeding apparatus.

Further, the cooling apparatus (cooling means) 8 is arranged to intake or exhaust air through the side wall of an apparatus cabinet at a vicinity of a position at which the carriage 20 is stationary in scanning the original by stopping the carriage 20 provided with the contact image sensor at a vicinity of an end side of an original base plate by an automatic original feeding apparatus. That is, the cooling means 8 is arranged at the vicinity of the stopping position of the scanning means and the image pickup means integrated to the carriage 20.

Thereby, by heat generation of the contact image sensor, a deterioration in an optical function at a single part caused by increasing an amount of enlarging the respective part due to thermal expansion and defocusing or color shift caused by deviating an allowance difference of a positional shift among the respective parts from an optical design value can be prevented.

The other constitution and operation are the same as those of the above-described embodiments and therefore, the same notations are attached to the same constituent portions and an explanation thereof will be omitted.

Further, a similar configuration can be constituted even when the scanning means is provided with both of the function of scanning the image of the original by moving in the sub-scanning direction (the direction indicated by an arrow in the drawing) and scanning the image of the original by moving the original while being stationary.

Further, the image reading apparatus of the embodiment is applicable to an image forming apparatus having an image forming portion for forming an image of the original picked up by the image reading apparatus on a sheet. Thereby, the image forming apparatus capable of forming an image of high quality at high speed can be realized.

In this way, by arranging the inverter at a region on a side on which power supplying means or communicating means is not arranged and providing cooling means to intake or exhaust air therefrom through a side face of a cabinet of an image reading apparatus at which the power supplying means or the communicating means is not arranged, a time period until temperature of the inverter is balanced can be prevented from being shortened or balancing temperature can be prevented from being elevated.

Further, by providing cooling means at a side face of the cabinet of an image reading apparatus at which the power supplying means or the communicating means is not arranged and a side face at a vicinity of image pickup means, in addition to the above-described effect, the image pickup means can also be cooled and therefore, image failure and occurrence of failure by exceeding guaranteed operational temperature at the image pickup means, and a deterioration of the optical function in accordance with a positional shift due to thermal expansion of the respective optical part can be prevented and therefore, the reading image of high quality can be provided.

Further, an image of high quality can be formed at high speed by applying the image reading apparatus of the invention to an image forming apparatus.

Although the embodiments of the invention have been explained, the invention is not limited to the embodiments but can be modified in all aspects within the technical thought.

What is claimed is:

1. An image reading apparatus comprising:
   an original base plate on which an original is to be placed;
   an image pickup means configured to pick up an image of the original;
   a cabinet having said original base plate at an upper portion thereof and containing said image pickup means;
   scanning means provided inside of the cabinet, the scanning means including a light source configured to illuminate the original and to focus the image of the original on the image pickup means;
   an inverter configured to drive said light source so that said light source emits light;
   driving means configured to drive the scanning means for movement to scan the original;
   supplying means configured to supply power to the image reading apparatus; and
   cooling means configured to form a flow path of air to cool an area inside of the image reading apparatus,
   wherein the driving means and the supplying means are provided at a vicinity of a first side face of the cabinet which is orthogonal to a main scanning direction of the scanning means,
   the cooling means is provided at a vicinity of the first side face of the cabinet, and
   the inverter is provided along a second side face, which is provided at an opposite side to the first side face of the cabinet, and is disposed in said flow path of air formed by the cooling means.

2. An image reading apparatus according to claim 1, further comprising a communicating unit configured to output read image data to another device, and being provided at a vicinity of the first side face of the cabinet.

3. An image reading apparatus according to claim 2, wherein said scanning means has at least one of either a function of scanning the image of the original by moving or a function of scanning the image by moving the original while being stationary..

4. An image reading apparatus according to claim 3, wherein said scanning means and the image pickup means constitute a reduction optical system.

5. An image reading apparatus according to claim 4, wherein the light source constitutes a xenon tube.

6. An image reading apparatus according to claim 4, wherein said scanning means and the image pickup means constitute an equal magnification optical system.

7. An image reading apparatus according to claim 1, further comprising a heat radiating member for radiating heat of the inverter, and being provided at a vicinity of the second side face of the cabinet.

8. An image reading apparatus comprising:
   an original base plate on which an original is to be placed;
   a cabinet having the original base plate at an upper portion thereof;
   image pickup means provided inside the cabinet and configured to pick up an image of the original;
   scanning means provided inside the cabinet, the scanning means including a light source configured to illuminate the original and to focus the image of the original on the image pickup means;
   an inverter configured to supply power to the light source so that the light source emits light;
   supplying means configured to supply power to a drive source inside of the image reading apparatus;
   a drive circuit configured to drive the image pickup means; and
   cooling means configured to form a flow path of air inside of the image reading apparatus and to cool the image reading apparatus,
   wherein the supplying means is provided at a vicinity of a first side face of the cabinet which is orthogonal to a main scanning direction of the scanning means,
   the inverter is provided at a vicinity of a second side face which is provided at an opposite side to the first side face of the cabinet,
   the cooling means is provided at a side face of the cabinet except the first side at which the supplying means is provided and is provided in a vicinity of the drive circuit to intake or exhaust air therefrom.

9. An image reading apparatus according to claim 8, wherein the scanning means has at least one of either a function of scanning the image of the original by moving in a sub-scanning direction or a function of scanning the image by moving the original while being stationary.

10. An image reading apparatus according to claim 8, wherein the scanning means and the image pickup means constitute a reduction optical system.

11. An image reading apparatus according to claim 10, wherein the cooling means is provided at a side face of the cabinet at a vicinity of the image pickup means.

12. An image reading apparatus according to claim 10, wherein the light source constitutes a xenon tube.

13. An image reading apparatus according to claim 8, wherein the scanning means and the image pickup means constitute an equal magnification optical system.

14. An image reading apparatus according to claim 13, wherein the cooling means is provided at a side face of the cabinet in a vicinity of a position at which the scanning means is stationary in scanning the original by stopping the scanning means.

15. An image reading apparatus according to claim 8, wherein the supplying means is provided outside of the cabinet and the inverter is provided inside the cabinet.

16. An image reading apparatus according to claim 8, further comprising a communicating unit configured to output read image data to any other device, wherein the communicating unit is provided at a vicinity of the first face of the cabinet.

17. An image reading apparatus according to claim 8, further comprising a motor configured to drive the scanning means, wherein the motor is provided at a vicinity of the first side face of the cabinet.

18. An image reading apparatus according to claim 8, wherein the inverter is provided along the first side face of the cabinet.

19. An image reading apparatus according to claim 8, wherein the cooling means is provided at a side face of the cabinet which is orthogonal to both the first side face and the second side face.

20. An image reading apparatus comprising:

an original base plate on which an original is to be placed;

a cabinet having the original base plate at an upper portion thereof;

image pickup means provided inside of the cabinet and configured to pick up an image of the original;

scanning means provided inside of the cabinet, the scanning means including a light source configured to illuminate the original and to focus the image of the original on the image pickup means;

an inverter configured to supply power to the light source so that the light source emits light;

supplying means configured to supply power to a drive source inside of the image reading apparatus; and cooling means configured to form a flow path of air inside of the image reading apparatus and to cool inside of the image reading apparatus, wherein the supplying means are provided at a vicinity of a first side face of the cabinet which is orthogonal to the main scanning direction of the scanning means, the inverter is provided along a second side face which is provided at an opposite side to the first side face of the cabinet, the cooling means is provided at a vicinity of the first side face of the cabinet, the inverter is provided to be opposed to a direction of the flow path of air formed by the cooling means.

\* \* \* \* \*